May 5, 1970
B. W. KING
3,509,766
CASING UNIT FOR AN INSTRUMENT FOR MEASURING
AN ELEVATION ABOVE WATER LEVEL
Filed Sept. 6, 1968
2 Sheets-Sheet 1
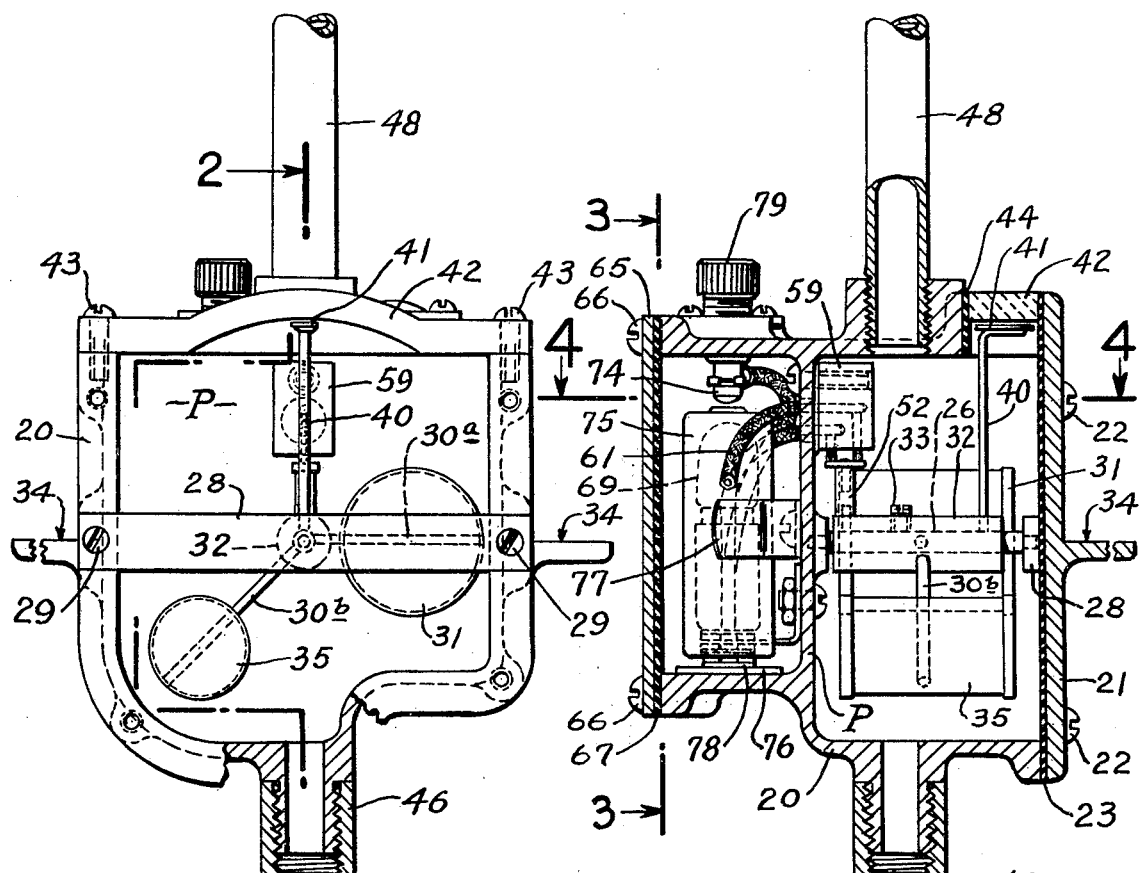
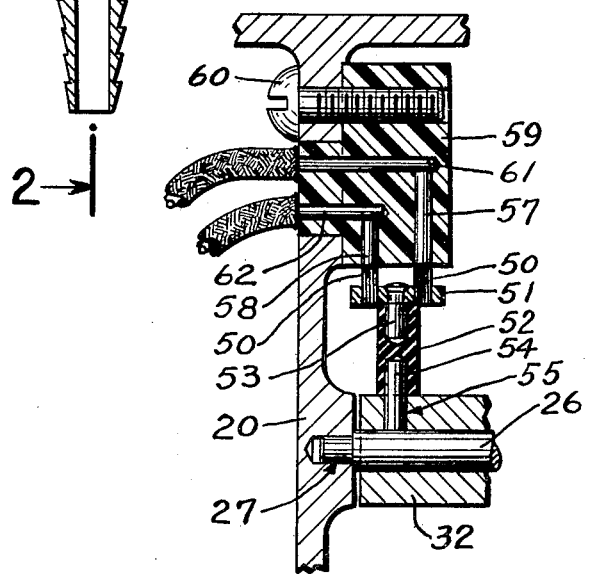

May 5, 1970  B. W. KING  3,509,766
CASING UNIT FOR AN INSTRUMENT FOR MEASURING
AN ELEVATION ABOVE WATER LEVEL
Filed Sept. 6, 1968  2 Sheets-Sheet 2
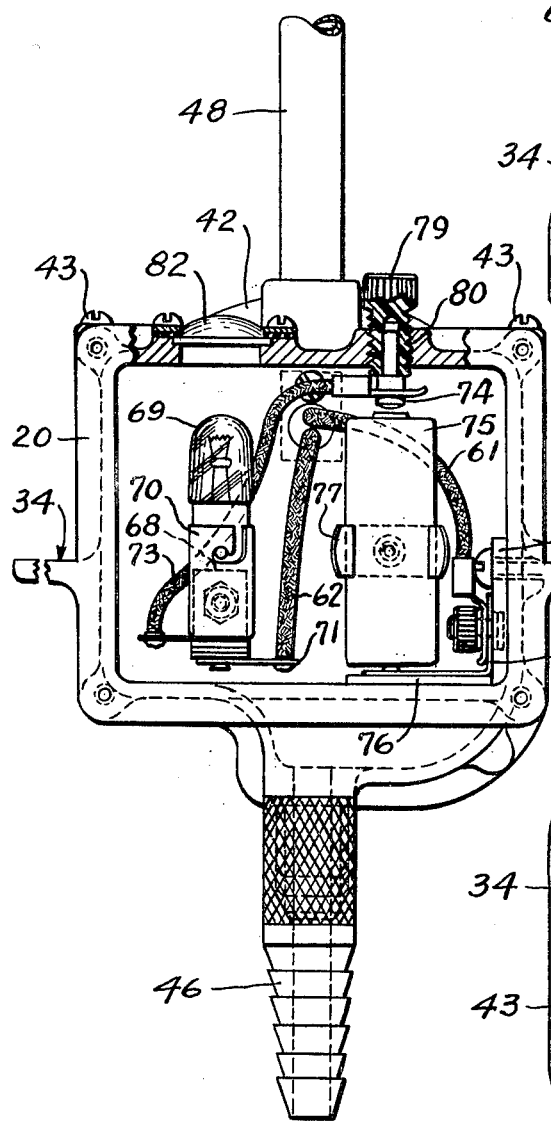
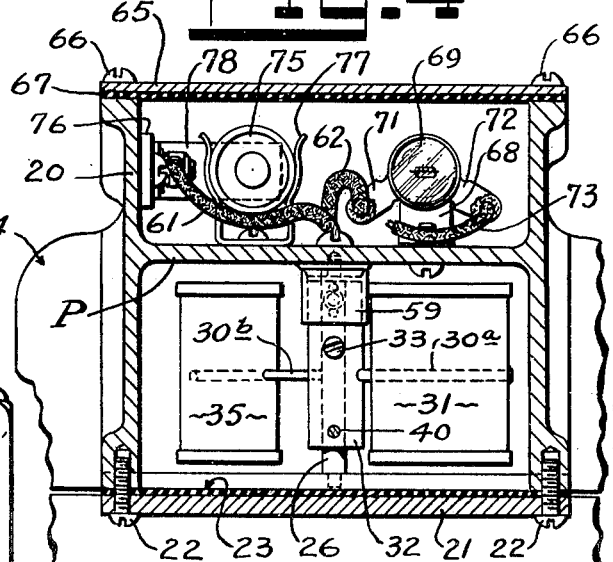
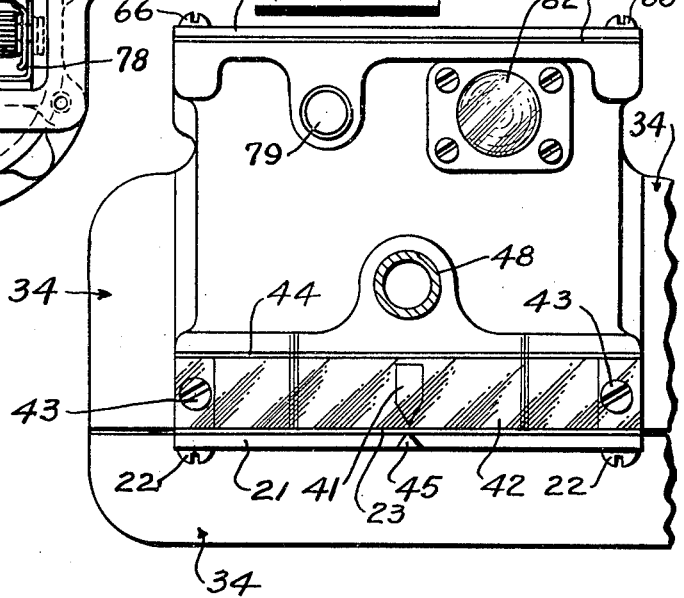

United States Patent Office 3,509,766
Patented May 5, 1970

3,509,766
CASING UNIT FOR AN INSTRUMENT FOR MEASURING AN ELEVATION ABOVE WATER LEVEL
Bertell W. King, deceased, late of Brooklyn, N.Y., by Bertell W. King, Jr., executor, Coral Sands, Harbour Island, Bahamas, and Marguerite N. Sherower, executrix, Brooklyn, N.Y. (both % B. W. King Inc., 7 Battery Place, New York, N.Y. 10004)
Filed Sept. 6, 1968, Ser. No. 758,161
Int. Cl. G01f 23/06
U.S. Cl. 73—290
6 Claims

ABSTRACT OF THE DISCLOSURE

A casing unit for an instrument for accurately determining the elevation of a position, such as the deck of a barge, with respect to the true or mean surface of the water. The casing unit has flat means for operating a switch connected with a light, which when lighted indicates that the instrument is at, or near, the surface of the water whereupon the elevation of the deck above the water line is measured. The casing unit herein is used in conjunction with a suspending means such as that described particularly in my Pat. 3,066,531 and includes a measuring line or tape. The invention herein is an improvement on the construction of my Pat. 3,210,999.

---

The casing unit herein preferably adjusts itself automatically for the specific gravity of the water as described in my aforesaid patent. In the device of Pat. 3,210,999 the light was on continuously which constituted a drain on the small battery carried by the casing. Also the movable shutter, in combination with a slot in the casing, alignment of which is used to indicate that the instrument was at water level, was too sensitive and the light observed was too fleeting or unobservable for the operator to set the instrument at water level easily or with proper assurance. Since the instrument is used frequently in dim light between barges or between barge and pier or even in darkness, a form of light signal appeared desirable. Part of this was probably due to the fact that the two slits gave initially a hair line of light or partial light, which widens and diminishes rapidly as the shutter slot approaches and recedes from full alignment with the casing slot.

It is the principal object of the invention to construct a casing unit for an instrument for measuring an elevation above true water level, which uses a light signal of sufficient duration to be easily seen by the operator and of sufficient accuracy to give a significant measurement since small errors can cause a material error in the calculations for a barge.

Another object is to construct an instrument casing unit which is relatively simple and inexpensive to manufacture.

Other objects of the invention will be more apparent from the following description when taken in connection with the accompanying drawings in which:

FIG. 1 is a side elevation of the casing with the access plate removed;

FIG. 2 is a section taken on line 2—2 of FIG. 1;

FIG. 3 is a side view of the battery and light chamber with its access plate removed and in partial section as taken on line 3—3 of FIG. 2;

FIG. 4 is a view into the float chamber in a section taken on line 4—4 of FIG. 2;

FIG. 5 is a top view; and

FIG. 6 is an enlarged sectional view of a float switch.

The casing unit or housing includes a casing member 20 having a cover 21 secured thereto by suitable screws 22 and forming an enclosed float chamber for two floats as will appear. A gasket 23 is used between the casing member and cover to seal the chamber. The two floats are connected together in opposition which connecting means includes a horizontal shaft 26, pivotally mounted in the chamber in a bearing 27 in one wall of the casing member and in a bearing 27 preferably carried by a cross bar 28 which is secured to and within the chamber such as by screws 29. The shaft preferably has a sleeve 32 secured thereto by a screw 33 to form the pivot. The sleeve carries cross arms 30a and 30b extending on opposite sides of the pivot. The cross arm 30a mounts a main float 31. The top surface 34 of an outer flange, forming a part of the casing, corresponds with the zero water level in the chamber, that is the normal level of the water with respect to the float means. In the construction shown this level is the center of the float 31 in normal operation or measuring position.

On the other and opposite cross arm 30b is a compensating means shown as a second float 35. Each of the two floats is carried on its respective cross arm so that the center of the main float and a projection of the center of the compensating float are equidistant from the axis of the pivot 26 as measured along a horizontal line through this pivot when in measuring position as illustrated. The floats are on opposite sides of the pivot. The floats are, therefore, connected together in opposition or so that their buoyancies are opposed.

In the illustrated construction the cross arm 30b extends angularly downwardly so that the compensating float is well below the level of the main float 31 for complete immersion in the water in the chamber when in measuring position. The compensating float 35 has a volumetric capacity or displacement which is equal to the immersed portion of the main float 31 and for a cylindrical main float would be half of its displacement. It is shown as of small diameter and of equal length to the main float. This brings the water line on the main float to its mid position. The weights of the two floats and their connections must be the same in order to remove weight as a factor. The compensating float serves to compensate for changes in the specific gravity of the water. With an angularly extending arm for the compensating float, the latter may be fixed to the arm which eliminates a pivot connection between float and its arm. The main float is also fixed to its arm. Both floats are sealed against leakage of water into the float. Additional details of the compensating float means is given in Patent 3,066,531.

An indicator is connected with the floats to show the position of the float means or the main float. The indicator shown is an upwardly extending pointer arm 40 which is secured to the pivot or pivot sleeve and it carries a pointer 41 which is visible through an arcuate transparent member 42 of glass, plastic or the like secured to the top of the casing, such as by screws 43. Gaskets 44 seal the same against water leakage. A fixed or reference pointer 45 may be carried by any stationary part of the casing, however, it is convenient that it be carried by the upper edge of the cover 21. Since the pointer may be twice as far from the axis of the pivot as the point of attachment of the float, this amplifies the movement of the pointer with respect to the float. The pointer is used as a check for the light or light indication if the pointer is visible and is used in the event the light is burned out or the battery dead.

In order to determine the mean level of the water surface in which the barge is floating, it is necessary that the water level within the casing chamber be free of normal surface agitation or waves. Suitable water inlet means is provided for this, as is known, which means is attached to inlet or nipple 46 at the bottom of the casing and extends well below the casing or below wave action. This nipple provides a part of the water inlet means for the float chamber.

A vent means is provided into the top or upper portion of the casing well above the casing and wave activity and includes a vent tube 48 secured to the casing in any suitable manner and provides an air connection with the float chamber. The casing is supported or suspended by suitable suspending means, conveniently attached to the vent pipe, which then forms a part of this means as described in the above patents.

Light means is used to indicate that the casing and the float means are or that surface 34 is at measuring water level. The light means includes a float switch which is closed by the float means when the latter is in measuring position. The float switch includes a switch plate shown as a conducting plate 51 having a pair of spaced plate contacts 50, 50 secured thereto which preferably are fine wire brushes or fringes. The conducting plate is secured to an insulated pedestal 52 by means of a stud 53 and the pedestal is secured to the float pivot or particularly the sleeve 32 by a stud 54 which is secured to the sleeve such as by being driven into a hole 55 in the sleeve. The float switch also includes spaced contacts 57 and 58 which are secured to the insulating block 59 and this switch block is secured to the casing by a screw 60 and a hole through the casing partition P.

The contact 57 is electrically connected with a wire 61 and the contact 58 is electrically connected to a wire 62. It may be desirable to provide a little pressure between the switch plate and its cooperating contacts. A simple way in which this pressure may be secured is by having the pedestal 52 of a suitable material, such as rubber, which is resilient. The pressure should be light enough not to affect the pivoting of or the sensitivity of the float means. The insulating block 59 and wires 61 and 72 may be cemented in place or in such manner as to provide a suitable water seal. The pedestal is shown as extending vertically when the float means is at measuring level. This is not essential but if it should project at an angle over the one of the floats such as the compensating float it must be included as part of the weight of the float or would enter into the weight balance between floats.

A light socket and batteryclip and connections, FIG. 3, are carried in a separate second chamber of the casing, access to which is provided by a cover 65 secured to the casing by screws 66. A gasket 67 seals the cover. A light 69 is held in place by a suitable socket 70 which is secured to a wall of the casing by a bracket 68 and screw. The socket provides a pair of connections, one connection 71 being connected with a wire 62 and another connection 72 being connected with a wire 73 which connects a battery switch contact 74 for engagement with the center or anode contact of a battery 75. It would be desirable to have the float switch within the light chamber which could easily be accomplished by extending the pivot means through the partition and the switch pedestal being carried on the extension. However, the seal for the extended pivot means may provide enough resistance to reduce significantly the sensitivity of the float means.

The battery is held in place by a releasing clip 77 which is secured to a wall of the casing and a second battery contact 78 is secured to a casing wall and spaced therefrom by insulation which contact engages the bottom of the battery envelope. The contact 78 is suitably connected with the wire 61. A simple form of battery switch 79 is provided through a threaded insulating switch operator 70 which is threaded into threaded whole 80 in the casing so that the turning of the switch operator brings the contact 74 into contact with the center core of the battery. The light 69 is in alignment with a window 82 carried by the casing which preferably is a lens for amplifying and concentrating the light and visibility.

The length of the switch pedestal 52, or particularly the distance of the contacts 50 and 50 from the pivot means axis, should not be so great that merely a momentary lighting of the lamp is secured. Also these contacts should not be at such a small distance from the axis of the pivot so that the switch is closed over too great an angular movement of the float means. The light should have a significant time in which it is lighted so that the casing can be accurately located at water level. If the period in which the light is lighted is too great, it is easy to read the measurements of high and low positions of the casing unit when the light goes out and interpolate the center of the two readings. The period of time when the light is lighted can be controlled during manufacture by the dimension or width of the contacts or connecting plate of the float means switch or both in the direction of movement of the connection switch plate as well as by the length of the pedestal or the radial distance of the switch plate from the pivot axis or both. For example, a longer pedestal would enable wider contacts to be used for the float switch without changing the period of time in which the light is on. The three dimensions are correlated with respect to each other. The light with this instrument provides the full light of the lamp to the operator when the casing is in the region of and at true water level.

In using the instrument, the operator lowers the same on the suspending means and locates the surface 34 about at the water level in which the barge is floating. The surface of the water usually is rough or wavy so that it would be more guesswork to locate the surface at the exact water level without aid from the float means and the light. Water, below any surface agitation flows through the water inlet means and casing inlet into the float chamber of the casing. The buoyancy of the float 31 will cause it to assume a position corresponding with the level of the water within the chamber. Since the water inlet connection is uninfluenced by surface agitation such agitation will not influence the position of the float means. With the main float 31 normally floating with the water level at its center or mid position the instrument is made to locate the float means and hence the surface 34 of the casing in measuring position at water level. With the float means and hence the casing in measuring position, the float means closes the float switch 50, 57, 58 and the light is illuminated to indicate measuring position. A reading is then taken on the suspending means.

If the light means is not functioning, or as a check, when the casing is at measuring position, the pointer 41 is located at the reference or reference pointer 45 on the casing. The operator, by raising or lowering the casing varies the water level within the chamber and the position of the main float with respect to the chamber. The pointer 41 indicates the position of the float means so that when this pointer is aligned with the fixed reference 45, the operator knows that the water level within the casing is at means water level and the surface 34 is at the true water level of the water in which the barge is floating. He will take the reading on the suspending means from the deck which gives him the elevation of this point of the deck above mean water or surface level. Illumination of the light over a range of roughly one sixteenth of an inch of the position of the casing would give sufficiently accurate results. If interpolation as to mid point of light when it goes on and then off, as the casing is moved through water level, the range may be considerably greater.

By taking a number of measurements around the barge the mean elevation of the deck may be determined which provides one of the factors from which the displacement of the barge may be calculated to give the weight of cargo on the barge or vessel.

If it is desirable to trap air in the top of the float chamber to provide some assurance that water does not reach the float switch, the connection between the vent pipe 48 and the float chamber may be brought below the switch as taught in Pat. 3,210,999.

This invention is presented to fill a need for improvement in a Casing Unit for an Instrument for Measuring an Elevation above Water Level. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A casing unit for an instrument for measuring the height of a surface above mean water level and having a suspending means comprising a casing having a float chamber and a cover for this chamber, a water inlet into the bottom of the float chamber, a vent pipe projecting upwardly from the casing, float means pivotally mounted within the float chamber, a float switch having a pair of spaced contacts and a connecting plate, the connecting plate being connected with the float means and pivotal therewith o close the switch when the float means is at measuring position within the casing, the switch plate radial distance and switch contact width being correlated such that the plate is radially spaced from the pivot axis a distance and the dimension of the contacts and plate of the float means switch being such as to give a discernible signal from the light when at measuring position, a second chamber within the casing having a cover, means wtihin the second chamber to mount a battery therein, battery contacts within the second chamber, one battery contact being connected with a switch contact, a lamp socket within the second chamber, a transparent window through the casing above the light socket, an electrical connection from the light socket to the other battery contact, and an electrical connection from the light socket to the other switch contact.

2. A casing unit as in claim 1 in which the float switch is located within the float chamber.

3. A casing unit as in claim 1 comprising a pointer attached to the pivot, and a transparent member at the top of the casing through which the pointer is visible.

4. A casing unit as in claim 1 in which the float switch plate is mounted on an insulating and flexible pedestal.

5. A casing unit as in claim 1 in which the float means includes an arm on one side of the pivot means which carries the main float and an arm on the opposite side of the pivot means extending angularly downwardly therefrom and an compensating float secured to this arm.

6. A casing unit as in claim 5 in which the main float and the compensating floats are fixed to its respective arm.

References Cited
UNITED STATES PATENTS

| | | | |
|---|---|---|---|
| 3,066,531 | 12/1962 | King | 73—290 |
| 3,210,999 | 10/1965 | King | 73—290 |

S. CLEMENT SWISHER, Primary Examiner